United States Patent [19]
Olds

[11] Patent Number: 5,741,096
[45] Date of Patent: Apr. 21, 1998

[54] LINE-LASER ASSISTED ALIGNMENT APPARATUS

[75] Inventor: Stephen P. Olds, Enumclaw, Wash.

[73] Assignee: The Boeing Company, Seattle, Wash.

[21] Appl. No.: 565,335

[22] Filed: Nov. 30, 1995

[51] Int. Cl.$^6$ ............................................. B23B 35/00
[52] U.S. Cl. .................. 408/1 R; 408/13; 408/16; 408/95
[58] Field of Search ................... 408/1 R, 13, 16, 408/95, 98

[56] References Cited

U.S. PATENT DOCUMENTS

| | | | |
|---|---|---|---|
| 4,383,373 | 5/1983 | Couturier | 33/286 |
| 4,598,481 | 7/1986 | Donahue | 33/288 |
| 5,111,406 | 5/1992 | Zachman | 408/16 X |
| 5,148,232 | 9/1992 | Duey et al. | 408/13 X |
| 5,316,014 | 5/1994 | Livingston | 128/754 |
| 5,320,111 | 6/1994 | Livingston | 128/754 |
| 5,439,328 | 8/1995 | Haggerty et al. | 408/1 R |
| 5,522,683 | 6/1996 | Kakimoto et al. | 408/16 X |
| 5,529,441 | 6/1996 | Kosmowski et al. | 408/1 R |

FOREIGN PATENT DOCUMENTS

| | | | |
|---|---|---|---|
| 0159312 | 7/1986 | Japan | 408/16 |
| 0178156 | 8/1986 | Japan | 408/16 |

*Primary Examiner*—Daniel W. Howell
*Assistant Examiner*—Henry W. H. Tsai
*Attorney, Agent, or Firm*—Lawrence W. Nelson

[57] ABSTRACT

A line laser assisted alignment apparatus that uses two laser line generators to define a reference axis that is aligned to coincide with an axis of a drill bit or other rotational tool. The reference axis of the alignment apparatus is matched with a marked position on a lower surface of an object that is to be worked by the drill bit or other rotational tool.

11 Claims, 6 Drawing Sheets

LINE-LASER ASSISTED ALIGNMENT APPARATUS

Background of the Invention

1. Field of the Invention

The present invention relates to an apparatus for assisting in the alignment of a marked position on an object with a tool that is to perform an operation at that position, and more particularly to an apparatus and method for assisting a machine operator in the alignment of a marked position on a component with the axis of a tool.

2. Background Information

Figure 1:
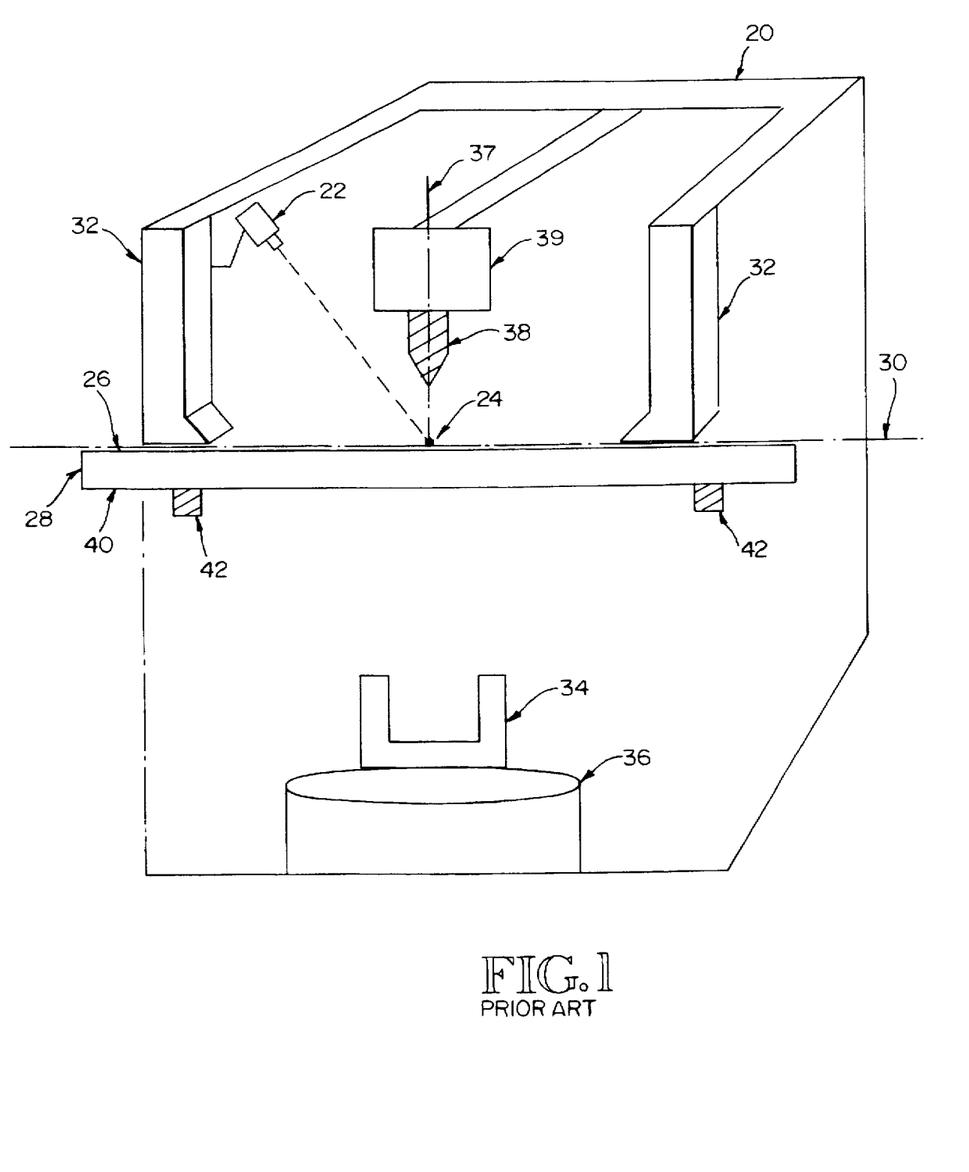
FIG. 1 is a perspective view of a conventional drilling device using a conventional drilling alignment system.

To precisely drill or machine a component at some marked point, such as a kato mark, an apparatus is often required to assist an operator in aligning the marked point with an axis of a drill bit or other tool that operates about an axis. For example, as shown in FIG. 1, a conventional drilling device 20, such as a Gemcor Drivematic G39A-60, uses a laser 22, such as the Spectra Physics laser spotter, to project a spot 24 onto an upper surface 26 of a component 28. The laser 22 focuses the spot 24 at a point on a reference plane 30, where the spot 24 is in alignment with an axis 37 of a drill bit 38 secured in a drill chuck 39 of the drilling device 20.

The reference plane 30, is defined by the base of two stationary symmetrical pressure feet 32 of the drilling device 20. Further, the upper surface 26 of the component 28 is held to the reference plane 30 by an anvil 34 that is raised into position by a hydraulic cylinder 36. Since the upper surface 26 of the component 28 will always lie along reference plane 30, there is no need to readjust the position of the spot 24 of the laser 22 so long as the upper surface 26 is planar. A marked point (not shown) on the upper surface 26 of component 28 is aligned with the axis 37 of the drill bit 38 by moving the component 28 along the reference plane 30 until the laser spot 24 is centered on the marked point of the component 28.

However, often the component 28 has a marked point (not shown) on a lower side 40, which is opposite the drill bit 38 and laser spot 24, and cannot be turned upside down to face the laser spot 24 because of size or shape limitations. Further, the surface of the component 28 that faces the drill bit 38 might also be restricted by a subsequent machining operation, such as a riveting operation, which requires entry of a rivet from a certain direction. Finally, flanges or other extensions 42 projecting from the component 28 may only allow the component 28 to be held in position when facing in a certain direction. In such cases, the conventional method of alignment of the axis 37 of the drill bit 38 and the mark on the lower surface 40 of the component 28 requires the operator to use a measuring device to manually transfer the marked point on the lower surface 40 to the upper surface 26 of the component 28. In the alternative, the operator drills pilot holes through the component 28 from the upper surface 26 to the lower surface 40. In any case, either of these methods is very time-consuming and represents a non-value added process. Accordingly, there is a need for a device that will assist in the alignment of a mark that is located on the lower surface 40 with the axis 37 of the drill bit 38.

An additional deficiency in conventional devices used to align the marked point with the axis 37 of a drill bit 38 is that the laser 22 is only capable of accurate alignment with a point lying on the non-adjustable reference plane 30. Thus, an alignment device is needed that is capable of aligning the axis 37 of the drill bit 38 with a marked point on component 28 regardless of whether the marked point lies within the reference plane 30. This capability is especially important if alignment is taking place at the lower surface 40 since the marked point will never lie on the reference plane 30, but instead will be some distance away from the reference plane 30 depending on the thickness of the component 28.

Other potential problems that occur when attempting to align the marked point on the lower surface 40 with the axis 37 of the drill bit 38 include vibration and shock to an alignment assisting apparatus caused by the upward movement of the cylinder 36 and the anvil 34. Also, the alignment assisting device may be obscured by extensions 42 or the like preventing it from properly assisting in the alignment of the marked point on the lower surface 40.

SUMMARY OF THE INVENTION

In accordance with one aspect of the invention, an apparatus assists in the alignment of a marked position on a marked surface of an object with a tool that is to perform an operation about an axis of the tool at the marked position. The apparatus comprises a first laser line generator radiating a first visible fan beam, which is visible on the marked surface of the object, in a first plane, and a second laser line generator radiating a second visible fan beam, which is visible on the marked surface of the object, in a second plane, the second visible fan beam intersecting the first visible fan beam of said first laser line generator along a reference axis that coincides with the axis of the tool.

In accordance with another aspect of the invention, a method aligns a marked point on a marked surface of an object with a axis of a tool. The method comprises the steps of generating a first visible fan beam, which is visible on the marked surface of the object, in a first plane, generating a second visible fan beam, which is visible on the marked surface of the object, in a second plane, the second visible fan beam intersecting the first visible fan beam along a reference axis, adjusting the reference axis so that it coincides with the axis of the tool, and moving the object to a position where the marked point on the marked surface of the object is aligned with the reference axis.

In accordance with yet another aspect of the invention, a drilling device comprises a drill bit that rotates about an axis, a driving mechanism for inducing the drill bit to rotate about the axis, and an apparatus for assisting a machine operator in the alignment of a marked point on a lower surface of a manufactured component with the axis of the drill bit, the drill bit being adjacent an upper surface of the manufactured component and opposite the lower surface of the component. The apparatus comprises a first laser generator radiating a first visible fan beam that is observable on the lower surface of the component, and a second laser generator radiating a second visible fan beam that is observable on the lower surface of the component and that intersects the first visible fan beam at a 90° angle to define a reference axis at the intersection, wherein the reference axis coincides with the axis of the drill bit. The apparatus also comprises a securing device that clamps the component into a position determined by the machine operator, and a monitoring device that allows the machine operator to observe the lower surface of the manufactured component while operating the drilling device.

DESCRIPTION OF THE PREFERRED EMBODIMENT

Figure 2:
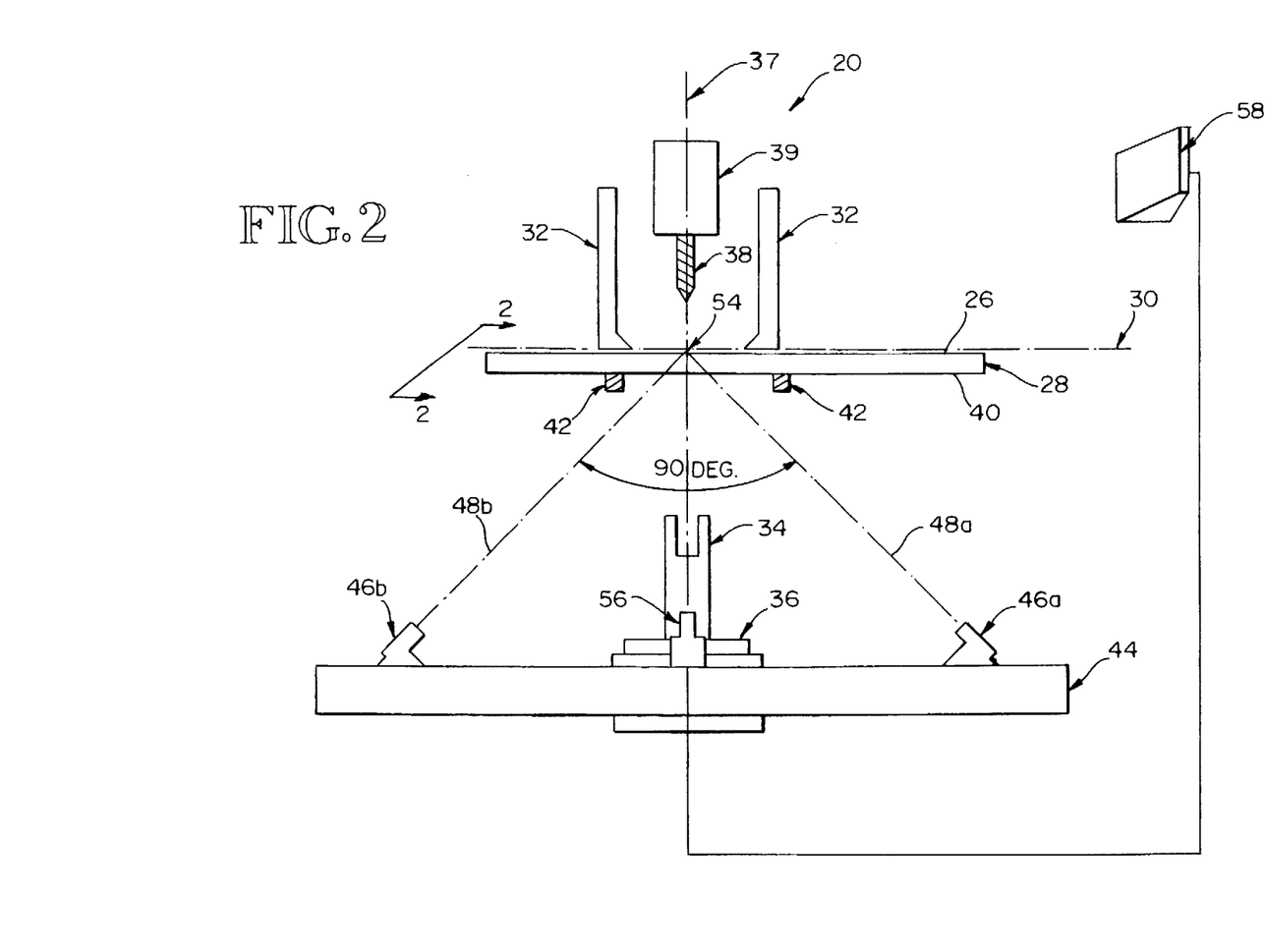
FIG. 2 is a side view of a first embodiment of a drilling device incorporating the drilling alignment system of the present invention.
Figure 3:
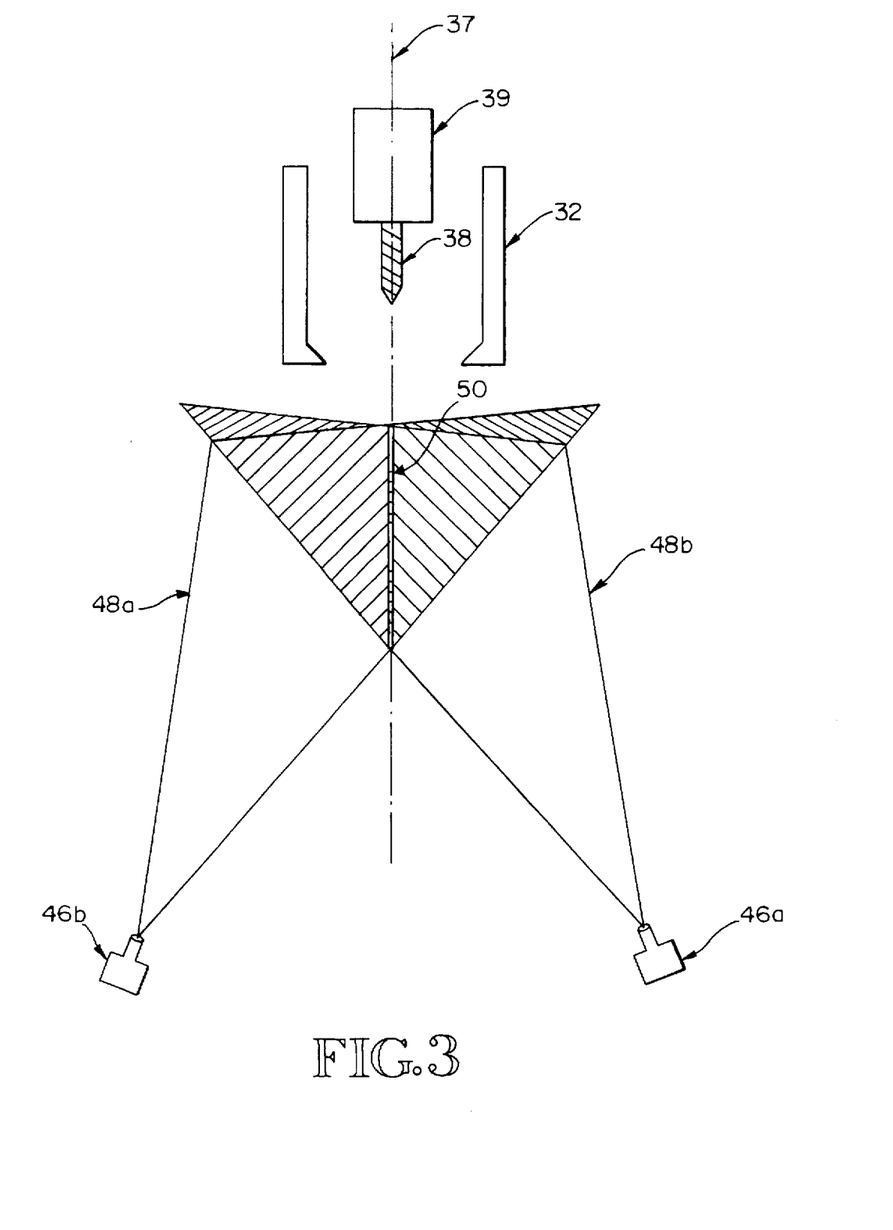
FIG. 3 is a diagrammatic view of a three-dimensional alignment field and two-dimensional reference axis produced by an intersection of the beams produced by the laser line generators of the present invention.
Figure 4:
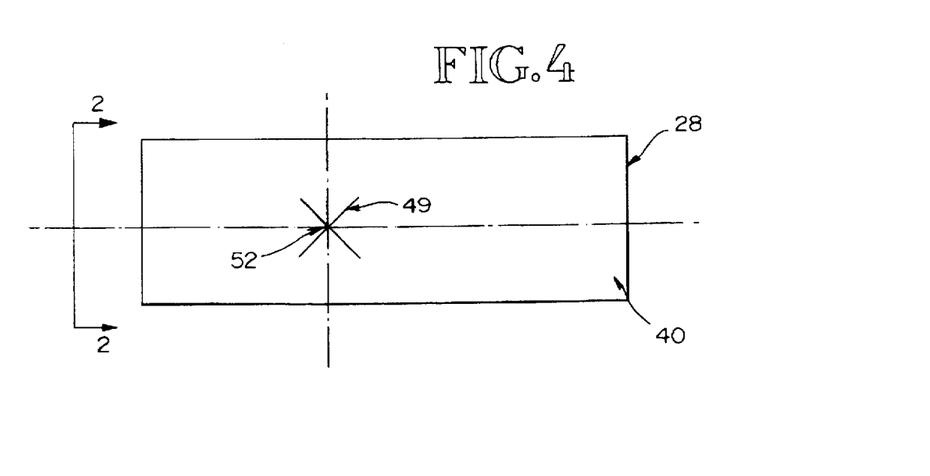
FIG. 4 is a bottom view of a component being illuminated by the lasers of the present invention, as seen along 2—2 of FIG. 2.

FIG. 2 shows the drilling device 20 that includes a platform 44 for supporting a portion of a line-laser assisted alignment apparatus of the present invention. The line-laser assisted alignment apparatus projects two intersecting visible fan beams 48a and 48b from laser line generators 46a and 46b, respectively. The visible fan beams 48a and 48b are projected from a position below the reference plane 30 and intersect each other along a reference axis 50, as shown in FIG. 3. The component 28, as shown in FIGS. 2 and 4, is moved along the bottom of the pressure feet 32 of the drilling device 20 until an intended drill location, indicated by a marked point 52 on the lower surface 40, overlaps the reference axis 50 which has been aligned to coincide with the axis 37 of the drill bit 38. The cylinder 36 is then raised until the anvil 34 locks the component 28 against the pressure feet 32.

The two laser line generators 46a and 46b, as shown in FIG. 2, of a type known in the art, are employed by the line-laser assisted alignment apparatus. They comprise a solid state miniature non-scanning laser. The line generators 46a and 46b also include a prism lens, such as a front axion lens assembly (not shown), located at the laser's optical port for converting a pencil beam from the non-scanning laser to one of the projected fan beams 48a and 48b.

Figure 5:
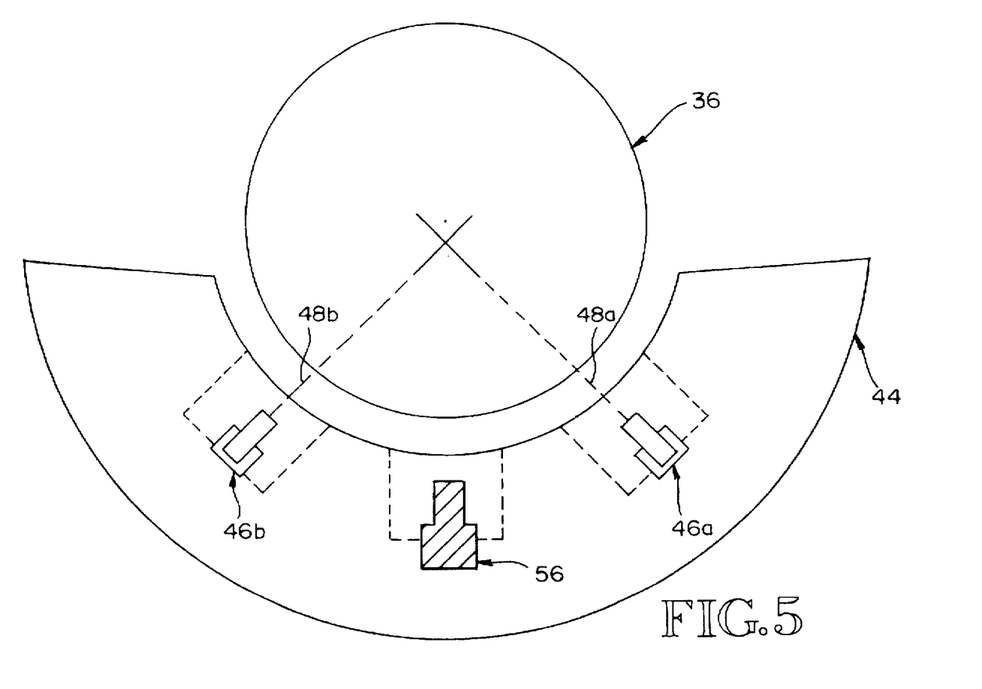
FIG. 5 is a top view of a platform supporting laser line generators and a camera of the present invention.

As is best shown in FIG. 5, the platform 44 supporting the two laser line generators 46a and 46b is preferably shaped as a semicircle with its concave portion facing toward the cylinder 36. The platform 44 is axially offset from the drilling axis 37 and positioned below the reference plane 30, which is defined by the bottoms of the pressure feet 32 of the drilling device 20. The placement of the platform 44 permits other mechanical operations, e.g., riveting, to operate along the axis 37 of the drill bit 38. In a preferred embodiment, the platform 44 is physically separated from the drilling device 20 to avoid any disruptive vibration.

The laser line generators 46a and 46b are preferably placed on the perimeter of the semicircular platform 44 at positions 90 degree apart with respect to axis 37, and their respective fan beams 48a and 48b point upward at 45 degree angles with respect to the reference plane 30, as shown in FIG. 2. Further, as shown in FIG. 3, the fan beams 48a and 48b form 10 degree fan angles presenting two vertical planes. Preferably, the laser line generators 46a and 46b are aligned so that the geometric center of their respective visible fan beams 48a and 48b are directed to a focal point 54 approximately two feet above the platform 44, as shown in FIG. 2. The focal point 54 is preferably a location where the axis 37 of the drill bit 38 intersects the reference plane 30. When aligned in this manner, the reference axis 50, which is defined by the intersection of fan beams 48a and 48b, runs along the axis 37 defined by the drill bit 38.

In a preferred embodiment, a camera 56 is positioned on the perimeter of the semicircular platform 44 midway between laser line generators 46a and 46b, as shown in FIG. 5, and is directed toward and focused on the reference plane 30. The camera 56 is connected to a monitor 58, as shown in FIG. 2, allowing the operator to shift the position of the component 28 using an image in the monitor 58 to show when the marked point 52 is aligned with the intersection of cross-hairs 49 which are the visible manifestations of the fan beams 46a and 46b on surface 40, as shown in FIG. 4. Thus, the operator is not required to position himself awkwardly beneath the component 28 to see the marked point 52 on the lower surface 40. The camera 56 and monitor 58 preferably provide the image in color, which allows the operator to more easily distinguish the cross-hairs 49 on a darker textured surface as well as a metallic or highly polished surface.

In an alternative embodiment, the need for an operator can be eliminated by connecting the output from the camera 56 to a frame grabber (not shown) which determines the position of the marked point 52 relative to the intersection of the cross-hairs 49. A signal is then sent from the frame grabber to an X-Y positioning device (not shown), as is well known in the art, to move the component 28 along the reference plane 30 to a position where the marked point 52 overlaps the reference axis 50, i.e., at the intersection of cross-hairs 49.

Initially, prior to using the line-laser assisted alignment apparatus to aid in the drilling of component 28, it may occasionally be necessary to align the reference axis 50, which is created by the intersection of the fan beams 48a and 48b, so that it coincides with the axis 37 of the drill bit 38. The first stage of the adjustment to each of the laser line generators 46a and 46b is to focus them. In some instances the laser line generators 46a and 46b will require disassembly and removal of the prism that generates the planar beam at the output end of the non-scanning laser. The line laser generators 46a and 46b are adjusted so that their sharpest focus occurs where the non-altered pencil beams meet the reference plane 30 at the focal point 54. A piece of thin white poster board (not shown) or equivalent pressed flush against the ends of the pressure feet 32 can be used to define the reference plane 30. If the laser line generators 46a and 46b were disassembled, then the prism is reinstalled and adjusted to minimize any abnormal thicknesses and non-uniformity in the fan beams 48a and 48b.

The next stage in the adjustment of the line laser generators 46a and 46b is to calibrate their elevation. Proper elevation of the laser line generators 46a and 46b is established by adjusting their mounting set screws (not shown) until the image on monitor 58 clearly shows the cross-hairs 49 created by the fan beams 48a and 48b each symmetrically bisecting the other at a point lying roughly on the machine drill axis 37. White poster board can again be used to establish the position of the cross-hairs 49 of fan beams 48a and 48b at the reference plane 30.

Figure 6A:
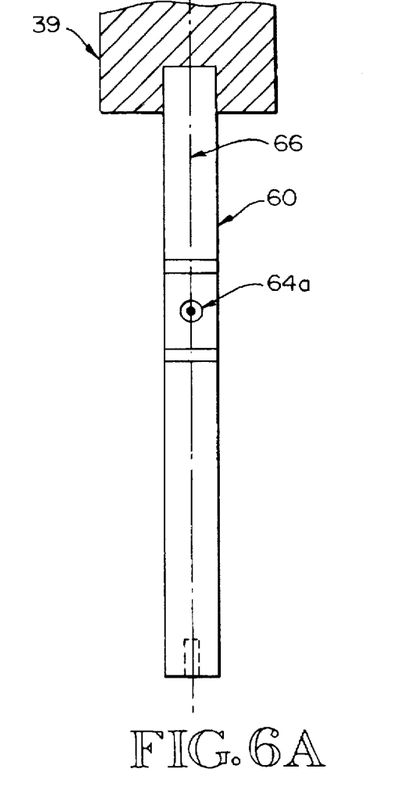
FIG. 6A is a front view of a laser alignment calibration rod of the present invention.
Figure 6B:
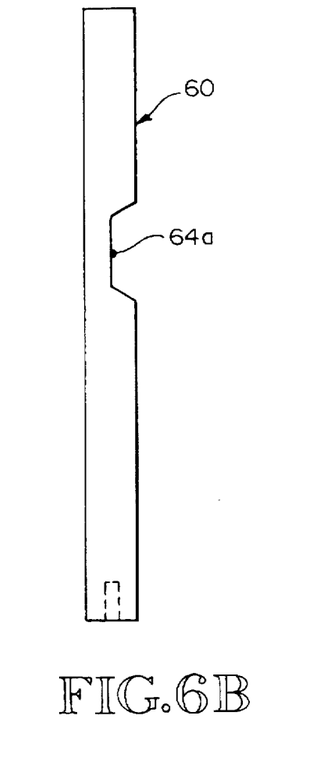
FIG. 6B is a side view of the laser alignment calibration rod of the present invention.
Figure 6C:
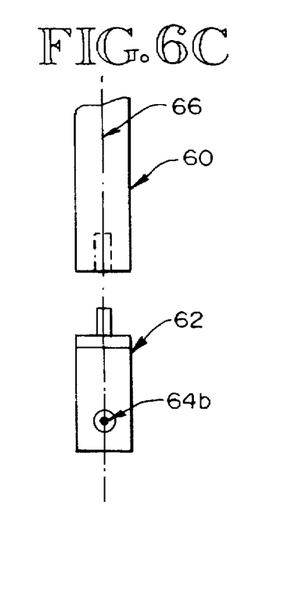
FIG. 6C is a front view of a laser alignment calibration attachment of the present invention.
Figure 6D:
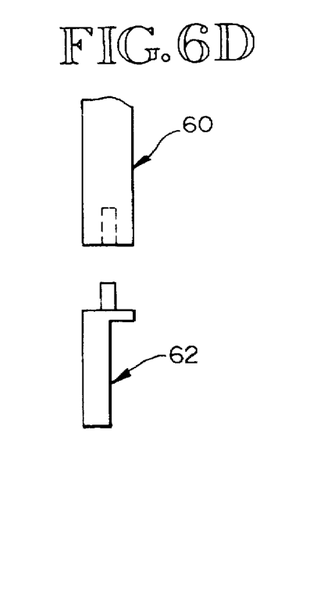
FIG. 6D is a side view of the laser alignment calibration attachment of the present invention.

To more precisely align the reference axis 50 with the axis 37 of the drill bit 38, the drill chuck 39 is opened and the drill bit 38 is replaced by a laser alignment calibration rod 60, as shown in FIGS. 6A and 6B. Once the calibration rod 60 is secured in the drill chuck 39, it is rotated and observed to check for improper seating which is indicated by a wobbling motion. The calibration rod 60 is observed either visually or by holding a dial indicator micrometer flush to it to detect the wobbling motion. If the calibration rod 60 is properly seated, a laser alignment calibration attachment 62 is coupled to the calibration rod 60, as shown in FIG. 6C and FIG. 6D. In an alternative embodiment, the calibration attachment 62 can be permanently attached to the calibration rod 60. Once coupled, the calibration attachment 62 is rotated until alignment point 64a on the calibration rod 60 and alignment point 64b on the calibration attachment 62 both lie along centerline 66 and face in the same direction. The alignment points 64a and 64b are preferably spaced at least one inch apart. Further, the alignment points 64a and 64b are preferably only a few millimeters in diameter and have some form of reflective coating with a dark circle a few micrometers in diameter located at its center.

The alignment point 64a on the calibration rod 60 and the alignment point 64b on the calibration attachment 62 are used to align an azimuth and vertical orientation of the fan beams 48a and 48b. To accomplish these next stages in the alignment of line laser generators 46a and 46b, the calibration rod 60 along with the calibration attachment 62 are rotated until the alignment points 64a and 64b face the laser line generator 46a. Once the alignment of laser line generator 46a has been completed, the calibration rod 60 and calibration attachment 62 are rotated 90 degrees to face the laser line generator 46b. In the alternative, the alignment points 64a and 64b can be positioned in between the laser line generators 46a and 46b so that both the fan beams 48a and 48b may strike the alignment points 64a and 64b at a 45 degree angle, thereby eliminating the need to rotate the calibration rod 60 during this stage of the alignment. However, if the calibration rod is positioned at the 45 degree angle, then only one of the laser line generators 46a and 46b should be turned on at a time to avoid any confusion between fan beams 48a and 48b.

Figure 7A:
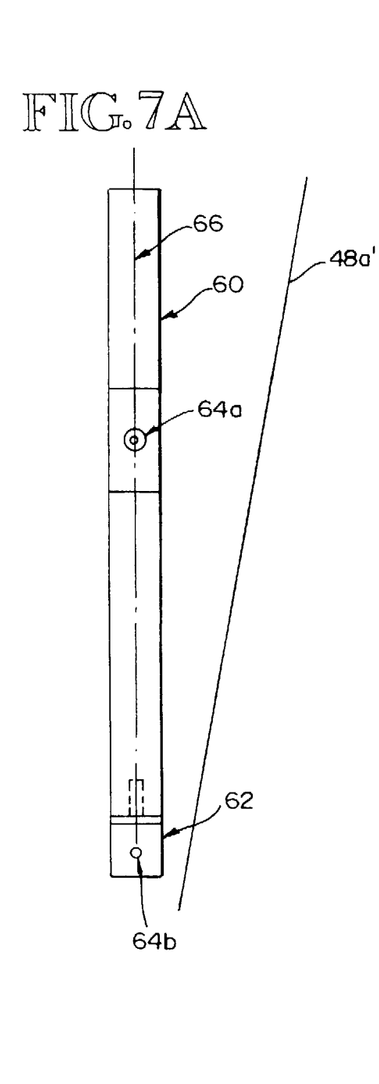
FIG. 7A is a view of the laser alignment calibration rod and vertical alignment calibration attachment showing a condition where a beam from one of the laser-line generators is out of alignment.
Figure 7B:
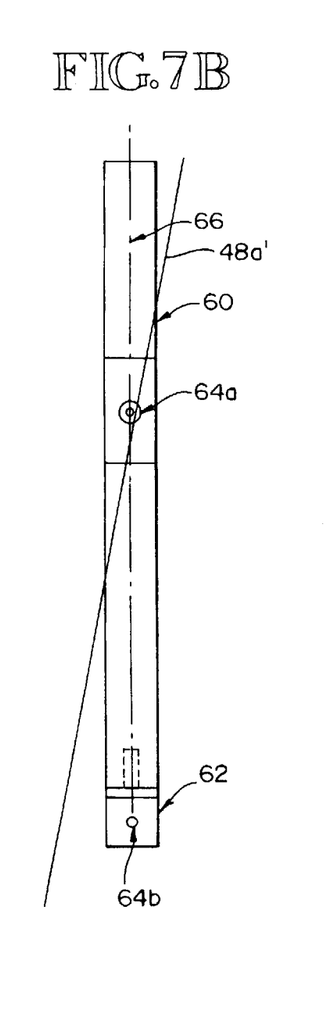
FIG. 7B is a view similar to FIG. 7A, but showing the beam after correction of laser azimuth.

Initially, the azimuth of the fan beams 48a and 48b is aligned. For example, the alignment of an un-calibrated beam, such as fan beam 48a', shown in FIG. 7A, is accomplished by manipulating a roll adjustment (not shown) on the laser line generator 46a until the fan beam 48a' overlaps the two alignment points 64a and 64b. If the operator is unable to align the fan beam 48a' so that it intersects the dark circles in both alignment points 64a and 64b, as shown in FIG. 7B, then the vertical orientation of the laser line generator 46a must be adjusted as well.

Figure 7C:
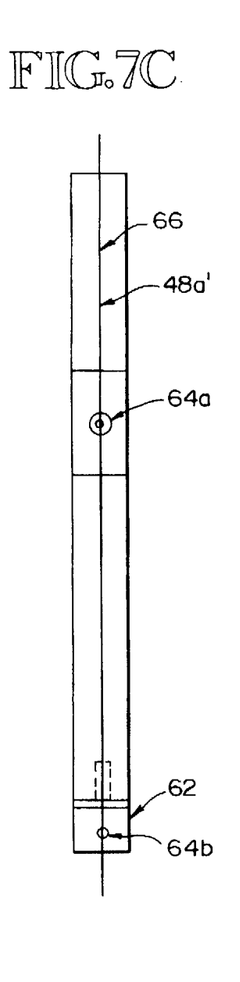
FIG. 7C is a view similar to FIG. 7B, but showing the beam after correction by laser rotation.
Figure 7D:
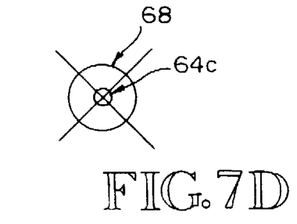
FIG. 7D is a view similar to FIG. 6F, but showing the position of properly aligned fan beams.

The vertical orientation of the fan beams 48a and 48b is corrected once the respective one of the laser line generators has had the azimuth of its beam aligned. For example, the vertical orientation of the fan beam 48a', shown in FIG. 7B, is corrected by adjusting mounting set screws (not shown) of the laser line generator 46a until the fan beam 48a' is rotated to a position that overlaps the dark circles of both alignment points 64a and 64b, as shown in FIG. 7C. However, one adjustment of both the vertical orientation and the azimuth of the laser line generators 46a and 46b may not be sufficient to achieve the proper alignment as shown in FIG. 7C. Accordingly, it may be necessary to repeat the adjustment of the vertical position and the azimuth of the fan beams 48a and 48b a number of times until proper alignment is achieved.

Figure 6E:
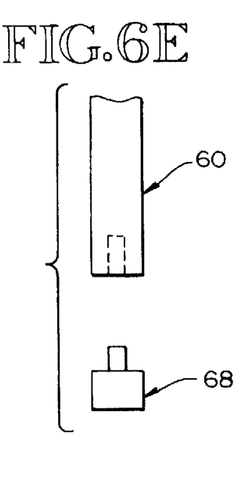
FIG. 6E is a front view of a laser alignment cross-hair centering attachment of the present invention.
Figure 6F:
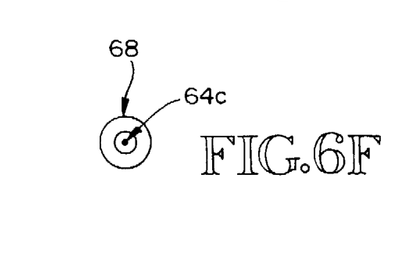
FIG. 6F is a bottom view of the alignment cross-hair attachment of the present invention.

In a preferred embodiment, a secondary check on the alignment of the laser line generators 46a and 46b using the calibration rod 60 is performed by replacing the calibration attachment 62 with a laser cross-hair centering attachment 68, shown in FIGS. 6E and 6F. If the fan beams 48a and 48b are properly aligned, then the cross-hairs 49 will intersect at an alignment point 64c of the cross-hair centering attachment 68. Once the proper alignment of the fan beams 48a and 48b has been confirmed, the laser brightness is adjusted, and the laser line generators 46a and 46b are re-secured under some form of transparent housing. Further, the drill chuck 39 is opened and the calibration rod 60 is replaced with the drill bit 38.

The image on the monitor 58 can be optimized by ensuring that the background is light enough to distinguish features on the lower surface 40 of the component 28, allowing navigation around the component 28. The image should also show a thin set of the cross-hairs 49 of the fan beams 48a and 48b, and the image should be free of any bright areas, which are usually caused by a saturation of the optical input to the camera 56. If reduction in camera contrast is insufficient to reduce the bright areas, then a polarizer or neutral density filter is placed in front of the lens to reduce the amount of light input to the camera 56 until the bright spot eliminated. In the alternative, the power of the laser line generators 46a and 46b might be lowered, or an aperture of the camera 56 might be reduced.

After the line laser assisted alignment apparatus has been adjusted so that the reference axis 50 is properly aligned, or was not found to require alignment, the component 28 is placed at the bottom of the pressure feet 32, with the anvil 34 in the down position. Once the component 28 is contiguous with the pressure feet 32, the operator observes the image in the monitor 58 and visually searches for a visible set of the cross-hairs 49 caused by the projection of the intersecting fan beams 48a and 48b on the lower surface 40 of the component 28. The set of the cross-hairs 49, as shown in FIG. 4, is typically about three inches square, and is used by the operator to line up the marked point 52 on the lower surface 40 of the component 28 with the axis 37 of the drill bit 38. This is accomplished by overlapping the intersection of the set of cross-hairs 49 with the marked point 52. Once the marked point 52 and the set of cross-hairs 49 have been aligned, the cylinder 36 is actuated, preferably by depressing a foot pedal, causing the anvil 34 to rise toward the pressure feet 32 until the component 28 is clamped into place against the pressure feet 32. Care must be taken to hold the component 28 in place during the last 2 to 3 inches of travel of the anvil 34, since the view of the camera 56 will be obscured at that point. After the component 28 is locked into place, the drilling device 20 is cycled, causing the component 28 to be drilled and then any subsequent operations to be performed, such as riveting. Finally, the anvil 34 to be released, and the component 28 is removed and inspected.

Although the above embodiment only uses the fan beams 48a and 48b of the laser line generators 46a and 46b to define a location within two dimensions, i.e. the reference axis 50, the line-laser assisting alignment apparatus of the present invention may easily be modified to define a location in three dimensional space by utilizing a third beam (not shown) directed to intersect the reference axis 50 at some point oblique to the reference plane 30 of the drilling device 20. Further, the line-laser assisted alignment apparatus can be easily modified to work effectively on the upper surface 26 of the component 28 by positioning the platform 44 and laser line generators 46a and 46b above the component 28.

The previously described versions of the present invention have many advantages including the fact that the set of cross-hairs 49 formed by the intersecting fan beams 48a and 48b always intersect on the reference axis 50, which is aligned with the axis 37 of the drill bit 38. The intersection of the set of cross-hairs 49 coincides with the axis 37 of the drill bit 38, even when the lower surface 40, upon which the set of cross-hairs 49 illuminates, is some thickness of the component 28 away from the reference plane 30. This allows the operator to accurately drill holes and place rivets on the lower side 40 of the component 28, even though the marked point 52 is not on the reference plane 30. Thus, the marked point 52 on the component 28 can be properly aligned with the axis 37 of the drill bit 38, even if the marked point 52 cannot be positioned face up, due to the shape of the component 28 or because of part appendages or extensions 42, such as flanges, stringers, etc.

The ability of the line-laser assisting alignment apparatus to align the marked point 52 with the axis 37 of the drill bit 38, even when the marked point 52 is facing away from the drill bit 38, translates into operator flexibility, reduced cycle time, removal of redundant processes, such as drilling pilot holes, and correspondingly fewer errors and defects.

Another advantage of the present invention is that the marked point 52 does not have to be visible to the operator prior to the drilling operation, but may be viewed remotely from the monitor 58 containing the image from the well positioned camera 56. Further, the line-laser assisting alignment apparatus can be positioned off-axis and does not require contact with the drilling device 20.

In conclusion, the line laser assisted alignment apparatus of the present invention uses the two laser line generators to define a reference axis that is aligned to coincide with an axis of a drill bit or other tool, such as a riveter, carbon dioxide laser, water cutter, countersink, etc. When the line-laser assisted apparatus is used in conjunction with a conventional alignment system for aligning a mark on the top surface of the component, the drilling device can be used in almost any situation regardless of the location of the mark.

While the detailed description above has been expressed in terms of specific examples, those skilled in the art will appreciate that many other configurations could be used to accomplish the purpose of the disclosed inventive apparatus. Accordingly, it will be appreciated that various equivalent modifications of the above-described embodiments may be made without departing from the spirit and scope of the invention. Therefore, the invention is to be limited only by the following claims.

What is claimed is:

1. An apparatus for assisting in the alignment of a marked position on a marked surface of an object with a tool that is to perform an operation about an axis of the tool at the marked position, said apparatus comprising:

a first laser line generator radiating a first visible fan beam, which is visible on the marked surface of the object, in a first plane wherein the marked surface of the object is facing away from the tool; and a second laser line generator radiating a second visible fan beam, which is visible on the marked surface of the object, in a second plane, the second visible fan beam intersecting the first visible fan beam of said first laser line generator along a reference axis that coincides with the axis of the tool.

2. The apparatus of claim 1 wherein said first laser line generator and said second laser line generator are positioned on a side of the object opposite that of the tool.

3. The apparatus of claim 1 wherein the first visible fan beam and the second visible fan beam intersect at 90°.

4. The apparatus of claim 1 wherein the tool comprises a drilling device including a drill bit.

5. The apparatus of claim 1 further comprising a holding device including:

pressure feet positioned on either side of the tool which prevent upward movement of the object toward the tool; and an anvil positioned below the tool that is used to prevent downward movement of the object away from the tool.

6. The apparatus of claim 1 further comprising:

a camera positioned to observe the first visible fan beam and the second visible fan beam on the marked surface of the object and outputting a first signal; and a monitor that receives the first signal and displays an image of the first visible fan beam and the second visible fan beam on the marked surface of the object.

7. A method of aligning a marked point on a marked surface of an object with an axis of a tool, said method comprising steps of:

positioning the marked surface of the object to face away from the tool;

generating a first visible fan beam which is visible on the marked surface of the object, in a first plane;

generating a second visible fan beam, which is visible on the marked surface of the object, in a second plane, the second visible fan beam intersecting the first visible fan beam along a reference axis;

adjusting the reference axis so that it coincides with the axis of the tool; and moving the object to a position where the marked point on the marked surface of the object is aligned with the reference axis.

8. The method of claim 7 wherein said step of adjusting the reference axis further includes the step of:

calibrating the elevation of the first visible fan beam and the second visible fan beam until the first fan beam, which is visible on the marked surface, symmetrically bisects the second fan beam which is visible on the marked surface.

9. The method of claim 7 wherein said step of adjusting the reference axis further includes the steps of:

aligning a vertical orientation of the first visible fan beam and the second visible fan beam until the first plane of the first visible fan beam and the second plane of the second visible fan beam are parallel with the axis of the tool; and aligning an azimuth of the first visible fan beam and the second visible fan beam until the first plane of the first visible fan beam passes though two points on the axis of the tool and the second plane of the second visible fan beam passes through two points on the axis of the tool.

10. The method of claim 7 further comprising the step of:

clamping the object to the position acquired in said moving step.

11. A drilling device comprising:

a drill bit that rotates about an axis;

a driving mechanism for inducing the drill bit to rotate about the axis; and an apparatus for assisting a machine operator in the alignment of a marked point on a lower surface of a manufactured component with the axis of the drill bit, the drill bit being adjacent an upper surface of the manufactured component and opposite the lower surface of the component, said apparatus comprising:

a first laser generator radiating a first visible fan beam that is observable on the lower surface of the component;

a second laser generator radiating a second visible fan beam that is observable on the lower surface of the component and that intersects the first visible fan beam at a 90° angle to define a reference axis at the intersection, wherein the reference axis coincides with the axis of the drill bit;

a securing device that clamps the component into a position determined by the machine operator; and a monitoring device that allows the machine operator to observe the lower surface of the manufactured component while operating the drilling device.

* * * * *